United States Patent
Hurtta et al.

(10) Patent No.: US 7,948,952 B2
(45) Date of Patent: May 24, 2011

(54) CONTROLLING SERVICES IN A PACKET DATA NETWORK

(75) Inventors: Tuija Hurtta, Espoo (FI); Zhi-Chun Honkasalo, Kauniainen (FI)

(73) Assignee: Nokia Corporation, Espoo (FI)

( * ) Notice: Subject to any disclaimer, the term of this patent is extended or adjusted under 35 U.S.C. 154(b) by 862 days.

(21) Appl. No.: 11/147,372

(22) Filed: Jun. 8, 2005

(65) Prior Publication Data

US 2005/0286540 A1    Dec. 29, 2005

(30) Foreign Application Priority Data

Jun. 28, 2004  (FI) ...................................... 20040888

(51) Int. Cl.
*H04W 4/00*  (2009.01)
(52) U.S. Cl. .......................... 370/338; 370/328; 370/401
(58) Field of Classification Search .................. None
See application file for complete search history.

(56) References Cited

U.S. PATENT DOCUMENTS

| | | | |
|---|---|---|---|
| 6,798,786 B1 * | 9/2004 | Lo et al. ......................... | 370/468 |
| 6,910,074 B1 * | 6/2005 | Amin et al. .................... | 709/227 |
| 6,970,930 B1 * | 11/2005 | Donovan ....................... | 709/227 |
| 7,146,350 B2 * | 12/2006 | Holland et al. ................. | 706/47 |
| 7,308,475 B1 * | 12/2007 | Pruitt et al. .................... | 709/203 |
| 7,430,187 B2 * | 9/2008 | Holt et al. ...................... | 370/329 |
| 2001/0026553 A1 | 10/2001 | Gallant et al. | |
| 2001/0039576 A1 * | 11/2001 | Kanada .......................... | 709/223 |
| 2002/0036983 A1 * | 3/2002 | Widegren et al. .............. | 370/401 |
| 2002/0080757 A1 * | 6/2002 | Narvanen et al. .............. | 370/338 |
| 2002/0169888 A1 * | 11/2002 | Nabkel et al. .................. | 709/238 |
| 2002/0184510 A1 | 12/2002 | Shieh | |
| 2003/0018766 A1 * | 1/2003 | Duvvuru ........................ | 709/223 |
| 2004/0119685 A1 * | 6/2004 | Harries et al. ................. | 345/156 |
| 2004/0153499 A1 * | 8/2004 | Heddaya et al. ............... | 709/202 |
| 2004/0153545 A1 * | 8/2004 | Pandya et al. .................. | 709/226 |
| 2005/0091505 A1 * | 4/2005 | Riley et al. .................... | 713/182 |

FOREIGN PATENT DOCUMENTS

WO  WO 03/041332  5/2003

* cited by examiner

*Primary Examiner* — Nittaya Juntima
*Assistant Examiner* — Tito Pham
(74) *Attorney, Agent, or Firm* — Mintz Levin Cohn Ferris Glovsky and Popeo, P.C.

(57) ABSTRACT

A method and system controls services in a packet data based communication network comprising terminal devices and service entities. In response to a change detected in the state of a connection between a terminal device and a gateway node, a service policy request for the terminal device is sent from the gateway node to a session control means. Service policies including service information indicating which service entities and in which order are to be utilized for providing services to the terminal device, are generated. Service policies are sent to the gateway node. At the service entities, services are provided.

41 Claims, 3 Drawing Sheets

CONTROLLING SERVICES IN A PACKET DATA NETWORK

BACKGROUND OF THE INVENTION

1. Field of the Invention

The invention relates to communication networks. In particular, the invention relates to controlling services in a packet data based communication network in a novel and improved way.

2. Description of the Related Art

Nowadays service providers of packet data based communication networks, e.g. Internet Protocol (IP) based communication networks like Internet and various wireless communication networks such as General Packet Radio Service (GPRS) enabled mobile communication networks, Wireless LAN networks, and Code Division Multiple Access (CDMA) based mobile communication networks, need to provide value-added services in their networks in order to attract private and corporate subscribers to their network. Many such services require introducing intermediate nodes via which packets are routed before routing them towards the eventual destination IP address. The intermediate nodes perform a variety of tasks, which may be associated with different protocol layers. Such intermediate nodes are also called proxies.

The various value-added services provided may be categorized into subscriber services and network services. Examples of the subscriber services include packet data based voice, email, content downloading, browsing, streaming and rich calls. The network services are offered by packet data based mobile communication networks to support the usage of subscriber services. These network services include e.g. rerouting, barring, accounting, content proxy services, content blocking services, firewall services, virus scanning services, antispam services, performance enhancement proxy services, Virtual Private Network (VPN) services, various Quality of Service (QoS) related services and various charging related services both for online and offline charging. Unless otherwise stated, in the following the term 'service' is used to refer to both subscriber and network services.

In the case of Differentiated Services (DiffServ) it is sufficient to process packets at IP layer to perform packet metering, marking, shaping and dropping. Differentiated Services are more closely defined in, for example, the IETF RFC 2475. In the case of Transmission Control Protocol (TCP) connection routing, packets must be processed at TCP layer. The purpose of TCP connection routing is, for example, to allocate servers from a server resource pool for TCP connection requests. Typically, such TCP connection requests are associated with Hypertext Transfer Protocol (HTTP) content requests. The HTTP is defined in the IETF RFC 2616. In the context of mobile networks TCP proxies are also used to enhance performance over a slow and unreliable link layer connections. In the case of an application layer proxy, multiple packets constituting an application layer message must be intercepted in an intermediate node. An application layer proxy comprises also the lower layers, that is, the IP layer and the TCP or UDP layer. Application layer proxies are used in a variety of services which may be specific to the application protocol. Examples of application protocols in which proxies are used are Hypertext Transfer Protocol (HTTP, IETF RFC 2616), Session Initiation Protocol (SIP, IETF RFC 2543) and Simple Mail Transfer Protocol (SMTP, IETF RFC 2821). Application layer proxies are also used as application level gateways which perform protocol adaptation between different application layer protocols.

In the case of HTTP examples of services applied are rerouting, barring, accounting and charging services. In rerouting services an HTTP GET operation specifying a given Uniform Resource Locator (URL) is redirected to a different URL so that the URL is rewritten. The actual domain name part in the URL may already have been translated into an IP address at the source node, so a new destination IP address must be written to the HTTP GET operation. In barring services the proxy intercepts and bars HTTP GET operations targeted to given URLs. In accounting and charging services the volume of HTTP traffic to and from a given server address may be counted, for example. The volume of traffic may be measured in terms of data volume, that is, the number of bytes, or number of requests and responses. In accounting and charging applications it is also necessary to match HTTP requests (for example, GET operation) with HTTP responses (for example, 200 OK response). The purpose is, for example, to avoid charging for requests for which no response is received. Therefore, the HTTP proxy must also maintain the state of the HTTP messaging.

In addition to those mentioned above, value-added services to be provided in packet data networks may include content proxy services, content blocking services, firewall services, virus scanning services, antispam services, performance enhancement proxy services, Virtual Private Network (VPN) services, various Quality of Service (QoS) related services and various charging related services.

In some cases proxies such as those mentioned above are implemented as separate actual network elements. However, providing a whole gamut of services with separate network elements for each type of service eventually becomes difficult and expensive. Therefore, in some cases several proxy functionalities may be implemented in a single physical network element as service entities. A network element that implements several services may need to have a wide variety of service entities. By a service entity is meant herein an intermediate functionality configured between a packet source and a packet destination, which participates in the providing of a given service for the packets or higher layer protocol data units transmitted therein between the source and the destination. In more elaborate cases the service entities implemented by a given network element may belong to different networks, which may be administered by different administrative authorities. Further, some of the service entities may be located outside of the original network element in a remote network element, for example, in cases where the processing involved requires special hardware or it is otherwise meaningful to distribute the functionality. In such a case a packet is first transferred from the original network element to the remote network element in order to render it to the processing associated with the remote service entity. Thereupon, it is transferred back to the original network element.

Usually, when a packet arrives to a network element providing multiple service entities pertaining to one or many services, the network element must decide which service entities should be applied for the packet, that is, which service entities the packet should traverse. For each service entity a decision must be made whether the service entity should handle the packet, that is, whether the packet should be passed to the service entity. The packet needs to go through several decision points to determine which service entities need to process the packet. The service entities needed depend on the service that needs to be rendered to the packet. During the traversal of the packet through multiple service entities, the decision point between two service entities may become very complex and time consuming. Furthermore, the same decision may need to be made repetitively to determine whether a packet needs to be passed to a given service entity or not.

Reference is now made to FIG. 1, which illustrates a prior art process of determining which particular service entities need to handle a given packet received at a network element. In FIG. 1 there is a network node 100, which provides local and remote service entities by means of which at least one service may be rendered to the packet. Network node 100 is, for example, a GPRS support node. Network node 100 comprises Service Entity 1, Service Entity 2 and Service Entity 4. Packets are also relayed to and from a remote Service Entity 3 operating in a remote network node 102. A remote service entity is in other words an out-of-the-box service entity. Network node 100 further comprises Decision Point 1, Decision Point 3, Decision Point 3 and Decision Point 4. Decision points 1, 2 and 4 are associated with Service Entities 1, 2 and 4. Decision Point 3 is associated with the remote Service Entity 3. A packet passed to the remote Service Entity 3 is illustrated with arrow 119 and a packet returned or sent by the remote Service Entity 3 is illustrated with arrow 120.

An IP packet received by network node 100 is represented by arrow 110. The IP packet is passed to Decision Point 1. Decision Point 1 determines based on, for example, IP layer header information, higher protocol layer header information within payload or other payload information in the IP packet whether the IP packet must be subjected to processing performed by Service Entity 1. If processing performed by Service Entity 1 is required for the IP packet, Decision Point 1 passes the IP packet to Service Entity 1 as illustrated with arrow 114. Otherwise, Decision Point 1 passes the IP packet to a next Decision Point 2 as illustrated with arrow 111. When Service Entity 1 has performed processing on the IP packet, Service Entity 1 passes it to Decision Point 2 as illustrated with arrow 115. In the same manner each Decision Point 1-4 of FIG. 1 in turn inspects the IP packet and makes the decision whether the IP packet is to be passed to the Service Entity associated with the Decision Point. When each Service Entity has processed the IP packet, it is passed by them to the next Decision Point.

As a result of processing performed by Service Entity 2 the IP packet may once again have to be subjected to inspection at Decision Point 1. This is illustrated with arrow 118, which represents the loop back to Decision Point 1. The IP packet may have been modified by Service Entity 2 in such a way that it is necessary to inspect whether Service Entity 1 should process it again. When the last Service Entity 4 has processed the IP packet, it is subjected to routing decisions for determining the next network element to which it must be sent. Subsequent IP packets received at network node 100 are subjected to similar processing through the chain of Decision Points and Service Entities.

The disadvantage of a solution such as the one illustrated in FIG. 1 is that a decision point between two adjacent service entities may become extremely complex and expensive to implement and maintain. Furthermore, same decisions may need to be made repetitively to determine whether a packet needs to be passed to a service entity or not. For example, if same higher layer protocol headers must be detected and parsed in a similar manner in several decision points, the performance of network node 100 is reduced significantly. Let us assume, for example, that Service Entities 1 and 3 are configured to act as HTTP proxies for any packets carrying HTTP GET operations requesting a URL which belongs to a given set of URLs. In this case Decision Points 1 and 3 must both comprise same functionality of scanning packets containing TCP and HTTP headers, parsing HTTP headers to determine the URL and then checking whether the requested URL belongs to the given set of URLs.

Additionally, configuration of new services to a network node such as network node 100 is complicated. The software in network node 100 must be updated to reflect the new service entities and the associated decision points that need to be added to the existing chain of service entities.

The aim of the invention disclosed herein is to alleviate the problems discussed hereinbefore and to introduce flexibility in the creation, modification and execution of service entity chains. The processing performance of value-added services in network nodes is improved by avoiding double processing associated with service determination, i.e. determination of required service entities for a value-added service.

SUMMARY OF THE INVENTION

A first aspect of the present invention is a method of controlling services in a packet data based communication network comprising one or more terminal devices and one or more service entities for providing services to the terminal devices. As described above, the term 'service entity' refers to a logical entity providing one or more services. The term 'service' is used to refer to a value-added service. One or more service entities may be comprised in a server-type network element dedicated solely to providing services. Alternatively or additionally one or more service entities may be integrated with network elements that also have other functions besides providing services. For example, one or more service entities may be integrated with a gateway node of the present invention.

A change in the state of a connection between a terminal device and a gateway node of the communication network is detected. In response to the detected change, a service policy request for the terminal device is sent from the gateway node to a session control means of the communication network.

In response to the received request, one or more service policies are generated at the session control means. The one or more service policies comprise service information indicating which service entities and in which order are to be utilized for providing services to the terminal device.

The session control means may be comprised in a separate network element. Alternatively the session control means may be integrated with a network element that also has other functions besides those of the session control means. For example, the session control means may be integrated with the gateway node of the present invention.

One or more generated service policies are sent to the gateway node. At one or more service entities services are provided in the indicated order.

A second aspect of the present invention is a system of controlling services in a packet data based communication network. The system comprises one or more terminal devices. The system further comprises one or more service entities for providing services to the terminal devices. The system further comprises a gateway node comprising a detecting means for detecting a change in the state of a connection between a terminal device and the gateway node. The gateway node further comprises a service policy request means for sending, in response to the detected change, a service policy request for the terminal device.

The system further comprises a session control means for generating, in response to the service policy request received from the gateway node, one or more service policies, each comprising service information indicating which service entities and in which order are to be utilized for providing services to the terminal device. The session control means is configured to send one or more generated service policies to the gateway node. One or more service entities further comprise a rule means for providing services in the indicated order.

A third aspect of the present invention is a network node comprising a session control means for generating, in response to a service policy request received from a gateway node of a packet data based communication network, one or more service policies, each comprising service information indicating which service entities of the communication network and in which order are to be utilized for providing services to a terminal device of the communication network. The session control means is configured to send one or more generated service policies to the gateway node.

A fourth aspect of the present invention is a computer program comprising code adapted to perform the following steps when executed on a data-processing device. A change is detected in the state of a connection between a terminal device of a packet data based communication network and a gateway node of the communication network. In response to the detected change, a service policy request for the terminal device is sent from the gateway node to a session control means of the communication network. In response to the received service policy request, one or more service policies, each comprising service information indicating which service entities and in which order are to be utilized for providing services to said terminal device are generated at the session control means. One or more generated service policies are sent to the gateway node. At one or more service entities, services are provided in the indicated order.

In an embodiment of the invention, the generated one or more service policies further comprise one or more service entity specific service rules according to which the service entities are to provide their services. The one or more service rules received from session control means are forwarded from the gateway node to the indicated service entities, in the indicated order. The services are provided according to the service rules received from the gateway node.

In an embodiment of the invention, the gateway node comprises one or more service entity specific service rules according to which the service entities are to provide their services. The one or more service rules are forwarded from the gateway node to the indicated service entities, in the indicated order. The services are provided according to the service rules received from the gateway node.

In an embodiment of the invention, prior to generating the one or more service policies, a request for subscription data associated with a subscriber of the terminal device is sent from the session control means to a subscriber database of the communication network. In response to the received request, the requested subscription data is sent to the session control means, and the received subscription data is utilized in generating the one or more service policies. The subscriber database may be, for example, a Home Location Register in a General Packet Radio Service enabled mobile communication network.

In an embodiment of the invention the subscription data associated with the subscriber of the terminal device is updated at the subscriber database. A request for the updated subscription data is sent to the subscriber database. In response to the received request, the requested updated subscription data is sent to the session control means.

In an embodiment of the invention the packet data based communication network is an Internet Protocol based wireless communication network.

In an embodiment of the invention the detected change is a received request for access bearer establishment. Alternatively or additionally the detected change may be a received request for access bearer modification. In case of GPRS, the request for access bearer establishment may be e.g. a 'Create PDP Context Request', whereas the request for access bearer modification may be e.g. an 'Update PDP Context Request'. The term 'access bearer' is used to refer to an information transmission path of a defined property, e.g. of a security tunnel, which access bearer is explicitly established across an access network between a terminal device and an access terminating gateway. One example of an access bearer is the PDP context in a GPRS system.

In an embodiment of the invention said detected change is a detected new service flow. The term 'service flow' is used to refer to a set of packet flows, defined by the L3-L7 and above lookup criteria. In the context of the present invention, a service flow is the lowest flow granulation to which a different set of service rules may be applied.

In an embodiment of the invention one or more received service rules are deleted at one or more service entities after an access bearer is released.

In an embodiment of the invention one or more received service rules are deleted at one or more service entities after the associated service flows are terminated.

In an embodiment of the invention one or more service policies received from the session control means are stored at the gateway node, e.g. for re-use.

In an embodiment of the invention one or more service rules received from the gateway node are stored at one or more service entities.

In an embodiment of the invention the Internet Protocol based wireless communication network comprises a Wireless Local Area Network (WLAN). A standard, IEEE 802.11, specifies the technologies for Wireless LANs. In a WLAN a mobile user can connect to a local area network through a wireless connection.

In an embodiment of the invention the Internet Protocol based wireless communication network comprises a General Packet Radio Service enabled mobile communication network.

In an embodiment of the invention the Internet Protocol based mobile communication network comprises a Code Division Multiple Access based network. In an embodiment of the invention, the gateway node is a Packet Data Serving Node (PDSN) of the Code Division Multiple Access based network.

In an embodiment of the invention prior to generating the one or more service policies, application session and media data is sent from an application function means to the session control means, and the received application session and media data is utilized in generating the one or more service policies.

The term 'application function means' refers to a network element which offers applications for IP based services. The application function means may, for example, be capable of communicating with a Policy Decision Function means in order to transfer dynamic QoS-related application information. The application function means may also be, for example, capable of communicating with a Charging Rules Function means in order to transfer dynamic charging-related application information.

In an embodiment of the invention the application session and media data is updated at the application function means, and the updated application session and media data is sent to the session control means.

In an embodiment of the invention the gateway node is a Packet Data Gateway of the Wireless LAN network.

In an embodiment of the invention the gateway node is a Gateway GPRS Support Node of the General Packet Radio Service enabled mobile communication network.

The invention allows improved flexibility in introducing new services in a communication network. Further, configuration of network nodes becomes easier. The processing performance of value-added services in network nodes is improved since double processing associated with service determination is eliminated.

BRIEF DESCRIPTION OF THE DRAWINGS

The accompanying drawings, which are included to provide a further understanding of the invention and constitute a part of this specification, illustrate embodiments of the invention and together with the description help to explain the principles of the invention. In the drawings.

DETAILED DESCRIPTION OF THE PREFERRED EMBODIMENTS

Reference will now be made in detail to the embodiments of the invention, examples of which are illustrated in the accompanying drawings.

Figure 1:
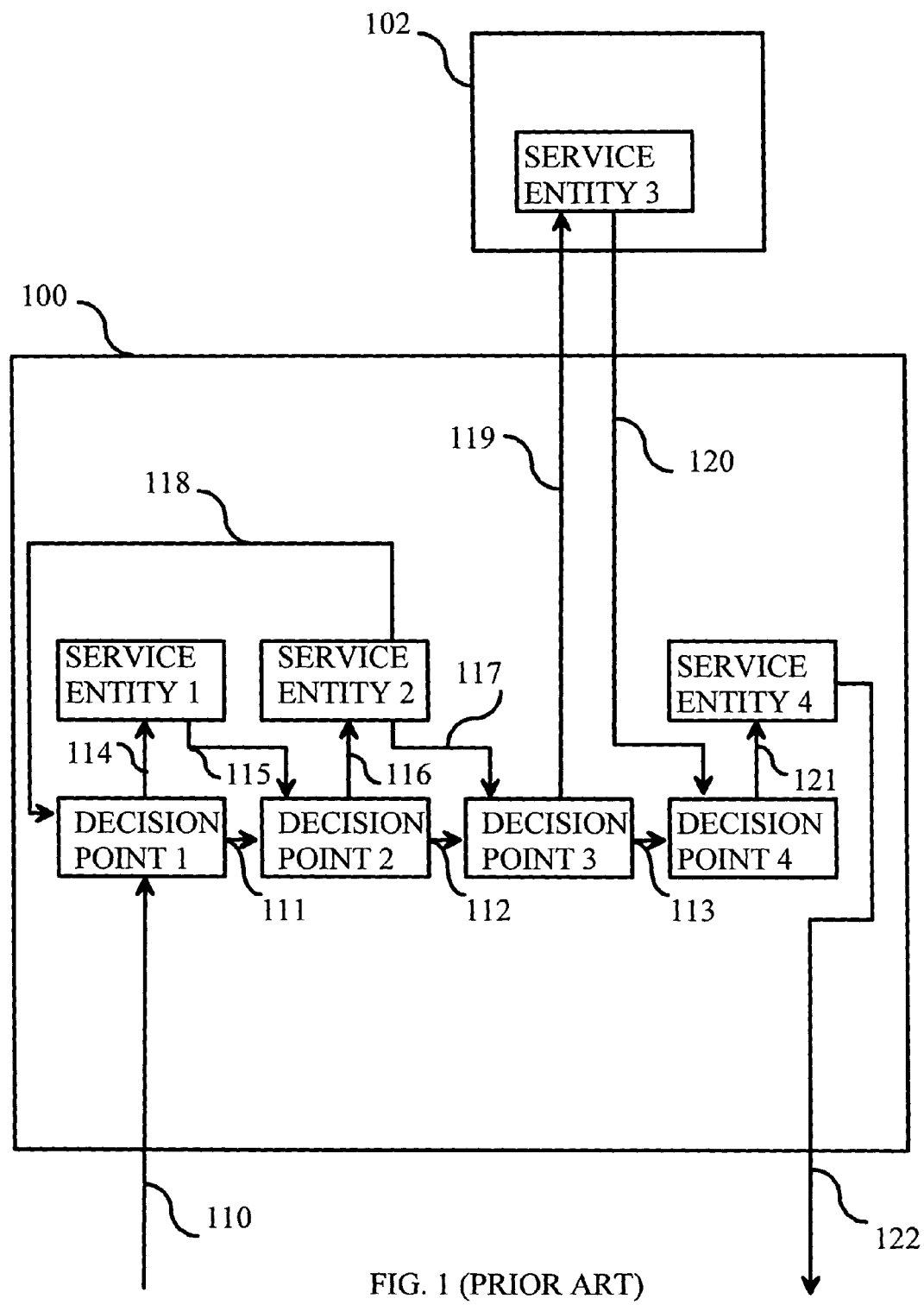
FIG. 1 is a block diagram illustrating a prior art network node comprising several service entities.
Figure 2:
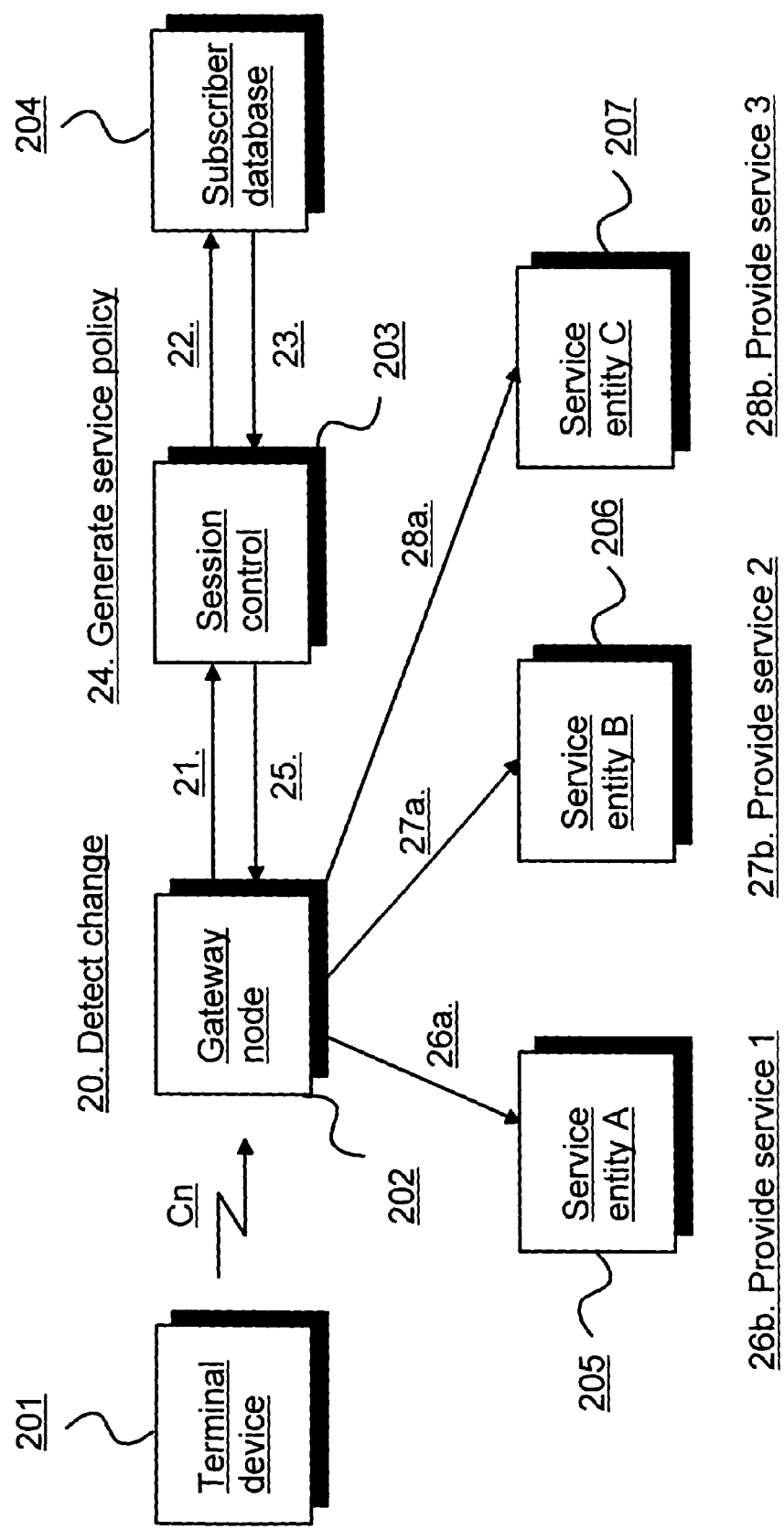
FIG. 2 is a graphical representation illustrating a method according to an embodiment of the present invention.

FIG. 2 illustrates an exemplary embodiment of the method of the present invention. At step 20 a change in the state of a connection Cn between a terminal device 201 of a communication network and a gateway node 202 of the communication network is detected. The change may be e.g. an access bearer establishment or an access bearer modification or detection of a new service flow. In response to the detected change, a service policy request for the terminal device 201 is sent from the gateway node 202 to a session control means 203 of the communication network, step 21.

In response to the received service policy request, at step 22, a request for subscription data associated with a subscriber of the terminal device 201 is sent from the session control means 203 to a subscriber database 204 of the communication network. In response to the received request, the requested subscription data is sent to the session control means 203, step 23.

At step 24, one or more service policies are generated at the session control means 203. The one or more service policies each comprise service information indicating which service entities and in which order are to be utilized for providing services to the terminal device 201. In the exemplary embodiment illustrated in FIG. 2 the one or more service policies further comprise service entity specific service rules according to which the service entities are to provide their services. The received subscription data is utilized in generating the one or more service policies. In addition, information preconfigured in the session control means 203 may also be utilized in generating the one or more service policies. A service policy may be generated for an access bearer or a service flow.

A service rule may, for example, comprise two parts: a trigger condition and at least one action. The trigger condition may define packets that must be subjected to the action. In other words, if a packet matches the trigger condition, then the at least one action defined in the rule is taken on the packet.

If a given service entity is a content proxy, at least one service rule to be forwarded to it may be a rule for charging.

If a given service entity is a content blocking entity, at least one service rule to be forwarded to it may contain one or more addresses to be blocked (e.g. in the form of Uniform Resource Locators, URLs) and/or a content blocking category of the subscriber. If the content blocking category is included, mapping from the content blocking category to address or addresses to be blocked is preferably performed in the content blocking entity.

If a given service entity is a firewall, at least one service rule to be forwarded to it may contain one or more service flows to be allowed and/or a firewall category of the subscriber. If the firewall category is included, mapping from the firewall category to service flow or service flows to be allowed/blocked is preferably performed in the firewall.

One or more generated service policies are sent to the gateway node 202, step 25. The received service rules are forwarded to the indicated service entities 205, 206, 207, in the indicated order, steps 26a, 27a and 28a. One or more service rules may be forwarded immediately, and one or more service rules may be forwarded when a service flow to which the service rule is to be applied is detected. At the service entities 205, 206, 207 services are provided according to the received service rules in the indicated order, steps 26b, 27b and 28b. The service entities 205, 206, 207 may report status information on providing their services to the gateway node 202.

For example, a generated service policy may indicate that a service by service entity A 205 is to be provided first, a service by service entity B 206 next, and finally a service by service entity C 207.

A first way to implement this is that the service rule(s) for service entity A 205 are first forwarded to the service entity A 205, step 26a. Next, the service entity A 205 provides its service(s) according to the rule(s) it received, step 26b. Next, the service rule(s) for service entity B 206 are forwarded to service entity B 206, step 27a. Then, the service entity B 206 provides its service(s) according to the rule(s) it received, step 27b. Finally, the service rule(s) for service entity C 207 are forwarded to the service entity C 207, step 28a. Then, the service entity C 207 provides its service(s) according to the rule(s) it received, step 28b.

A second way to implement this is that the service rule(s) for the service entity A 205 are first forwarded to the service entity A 205, step 26a. Next, the service rule(s) for the service entity B 206 are forwarded to the service entity B 206, step 27a. Then, the service rule(s) for the service entity C 207 are forwarded to the service entity C 207, step 28a. After all the service rules have been forwarded, the service entity A 205 provides its service(s) according to the rule(s) it received, step 26b. Next, the service entity B 206 provides its service(s) according to the rule(s) it received, step 27b. Finally, the service entity C 207 provides its service(s) according to the rule(s) it received, step 28b.

The actual service providing by the service entities 205, 206, 207 comprises the service entities 205, 206, 207 processing packets forwarded by the gateway node 202 according to their services. For example, the gateway node 202 forwards packets to service entity A 205 which sends the packets back to the gateway node 202 after processing them according to its services. When receiving the processed packets from service entity A 205, the gateway node 202 forwards the packets processed by the service entity A 205 to service entity B 206 which sends the packets back to the gateway node 202 after having processed them according to its services. When receiving the processed packets from service entity B 206, the gateway node 202 forwards the packets to service entity C 207 which again sends the packets back to the gateway node 202 after having processed them according to its services.

Alternatively, the gateway node 202 may e.g. forward packets to service entity A 205 which forwards the packets to service entity B 206 after having processed them according to its services. Service entity B 206 processes the packets and forwards the packets to service entity C 207. Service entity C 207 forwards the packets to the gateway node 202 after having processed them according to its services. In this alternative, service entities A, B and C 205, 206, 207 need to know where to forward the packets after providing their services. This information may be included in the service policy.

Figure 3:
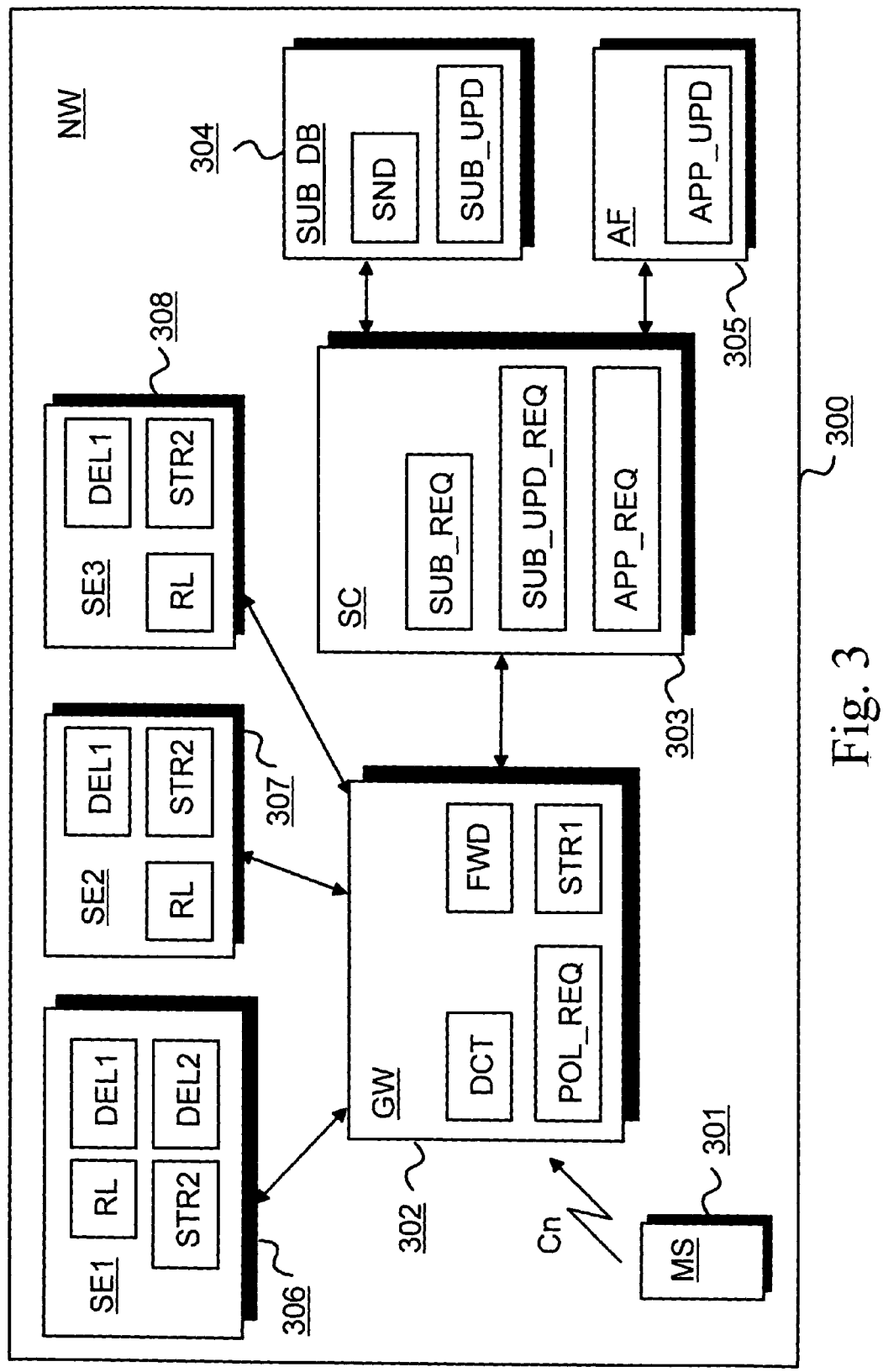
FIG. 3 is a block diagram illustrating a system according to an embodiment of the present invention.

FIG. 3 illustrates an exemplary embodiment of the system of the present invention which embodiment relates to controlling services in a packet data based communication network. The packet data based communication network NW 300 may comprise e.g. a General Packet Radio Service enabled 3GPP mobile communication network. Alternatively the packet data based communication network NW 300 may comprise e.g. a WLAN network or a Code Division Multiple Access based network.

The exemplary system of FIG. 3 comprises mobile stations MS 301, one of which is illustrated in FIG. 3. The system further comprises service entities SE1, SE2 and SE3 306, 307, 308 for providing services to the mobile stations.

The exemplary system of FIG. 3 further comprises a gateway node GW 302. The gateway node GW 302 may be e.g. a Gateway GPRS Support Node. Alternatively the gateway node 302 may be e.g. a Packet Data Gateway of a WLAN network or a Packet Data Serving Node of a Code Division Multiple Access based network. The gateway node GW 302 comprises a detecting means DCT for detecting a change in the state of a connection Cn between a mobile station 301 and the gateway node GW 302. The gateway node GW 302 further comprises a service policy request means POL_REQ for sending, in response to the detected change, a service policy request for the mobile station MS 301. The detected change may be e.g. a request for establishing or modifying an access bearer for the mobile station MS 301, the request having been received at the gateway node GW 302. If the packet data based communication network NW 300 comprises a General Packet Radio Service enabled mobile communication network, the request for access bearer establishment or modification may be e.g. a 'Create PDP Context Request' message, or e.g. an 'Update PDP Context Request' message received from a Serving GPRS Support Node to a Gateway GPRS Support Node acting as the gateway node GW 302 of the present invention. Alternatively the detected change may be e.g. a detected new service flow for the mobile station MS 301.

The exemplary system of FIG. 3 further comprises a session control means SC 303 for generating one or more service policies in response to the service policy request received from the gateway node GW 302. The session control means SC 303 may comprise an authorization function, a function for control of charging, e.g. the Service Data Flow Based Charging Rules Function of 3GPP, a function for control of QoS, e.g. the Policy Decision Function of 3GPP, a credit control function, e.g. the Service Data Flow Based Credit Control of 3GPP, and/or a function for control of service entities. The one or more service policies each comprise service information indicating which service entities and in which order are to be utilized for providing services to the terminal device 301. In the exemplary embodiment illustrated in FIG. 3 the service policies further comprise service entity specific service rules according to which the service entities are to provide their services. The session control means SC 303 is configured to send one or more generated service policies to the gateway node GW 302. The gateway node GW 302 further comprises a forwarding means FWD for forwarding, in the indicated order, the received service rules to the indicated service entities. The service entities SE1 306, SE2 307, SE3 308 further comprise a rule means RL for providing services according to the received service rules in the indicated order. The gateway node GW 302 further comprises a first storage means STR1 for storing received service policies, e.g. for re-use. The service entities SE1 306, SE2 307, SE3 308 further comprise a second storage means STR2 for storing received service rules.

In the exemplary system of FIG. 3 the session control means SC 303 further comprises a subscription data request means SUB_REQ for sending a request for subscription data associated with a subscriber of the mobile station MS 301 to a subscriber database SUB_DB 304. The subscriber database 304 may be e.g. a Home Location Register. The subscriber database SUB_DB 304 comprises a sending means SND for sending, in response to the received request, the requested subscription data to the session control means SC 303 which session control means SC 303 is further configured to utilize the received subscription data in generating the one or more service policies. The session control means SC 303 may be further configured to utilize information pre-configured in itself in generating the one or more service policies.

In the exemplary system of FIG. 3 the subscriber database SUB_DB 304 further comprises a subscription data update means SUB_UPD for updating the subscription data associated with the subscriber of the terminal device MS 301. The session control means SC 303 further comprises a subscription data update request means SUB_UPD_REQ for sending a request for the updated subscription data to the subscriber database SUB_DB 304. The subscription data update means SUB_UPD is further configured to send, in response to the received request, the requested updated subscription data to the session control means SC 303.

In the exemplary system of FIG. 3 the session control means SC 303 further comprises an application and service data request means APP_REQ for sending a request for application session and media data to an application function means AF 305. The application function means AF 305 is configured to send the requested application session and media data to the session control means SC 303 which session control means SC 303 is further configured to utilize the received application session and media data in generating the one or more service policies. Further, the application function means AF 305 comprises application session and media data update means APP_UPD for updating the application session and media data, and for sending the updated application session and media data to the session control means SC 303.

In the exemplary system of FIG. 3 the service entities SE1 306, SE2 307 and SE3 308 further comprise a first deleting means DEL1 for deleting one or more received service rules after an established access bearer is released. One or more service entities may further comprise a second deleting means DEL2 for deleting one or more received service rules after the associated service flows are terminated.

The following describes operation of the exemplary embodiment of FIG. 3 in more detail when the packet data based communication network 300 is a General Packet Radio Service enabled mobile communication network and when the application function means AF 305 is not involved, in other words when no application session and media data is sent by the application function means AF 305 to the session control means SC 303. The session control means SC 303 uses subscription data, information from the gateway node GW 302 and pre-configured information for decision making.

First, the gateway node GW 302 receives a request for access bearer establishment or modification, such as a Create PDP Context Request or Update PDP Context Request, comprising e.g. a user identification, an Access Point Name (APN), and an access network type. As is known by those skilled in the art, the Access Point Name is a reference to the gateway node to be used for e.g. GPRS access. The gateway node GW 302 determines whether control by the session control means SC 303 is required.

Next, if control by the session control means SC 303 is required, the gateway node GW 302 resolves the address of the session control means SC 303 e.g. by using pre-configured address information of the session control means SC 303. The gateway node GW 302 sends a service policy request comprising the user identification, the APN, and the access network type to the session control means SC 303. The gateway node GW 302 may receive the access network type in the request for access bearer establishment or modification. Alternatively the gateway node GW 302 may derive the access network type e.g. from the address of a Serving GPRS Support Node. The address of the session control means SC 303 may be pre-configured in the gateway node GW 302 per APN.

Next, if subscription data is not available in the session control means SC 303, the session control means SC 303 may send a request for subscription data comprising the user identification and the APN to the subscriber database SUB_DB 304 to retrieve the subscription data.

Next, the subscriber database SUB_DB 304 replies by sending the subscription data to the session control means SC 303. The subscription data comprises e.g. a unique subscription identity, a list of services provisioned for the subscription and personal attributes for rule creation. The session control means SC 303 stores the subscription data.

Next, the session control means SC 303 generates one or more service policies and sends one or more generated service policies to the gateway node GW 302. In this exemplary embodiment, when generating a service policy, the session control means SC 303 take into account information sent by the gateway node GW 302, subscription data and information pre-configured in the session control means SC 303 (e.g. service—service flow mapping, subscription data attribute—service rule mapping). In addition to the service information and the service rules comprised in the generated one or more service policies, the session control means SC 303 may send to the gateway node GW 302 a list of services allowed on the access bearer, indication of maximum values for the QoS class and indication of maximum bit rates for the access bearer, indication of maximum values for the QoS class and indication of maximum bit rates for each service flow.

The gateway node GW 302 enforces the received service policies. The gateway node GW 302 determines which service rules have to be indicated to the service entities and sends such rules to them. The gateway node GW 302 may also store the service rules for later distribution to the service entities, for example until a corresponding service flow is detected at the gateway node GW 302. Finally, the gateway node GW 302 acknowledges the access bearer establishment or modification.

The following describes operation of the exemplary embodiment of FIG. 3 in more detail when the packet data based communication network 300 is a General Packet Radio Service enabled mobile communication network and when the application function means AF 305 is involved. Involvement of the application function means AF 305 may be relevant e.g. when establishing or modifying secondary access bearers. Application session and media data is sent by the application function means AF 305 to the session control means SC 303. The session control means SC 303 uses the application session and media data from the application function means AF 305, the subscription data, information from the gateway node GW 302 and pre-configured information for decision making.

Multiple application sessions may be ongoing in parallel. These application sessions may be supported by multiple application function means (not illustrated in FIG. 3). The address of the session control means SC 303 may be pre-configured to the multiple application function means so that the multiple application function means can send information on the application session(s) to the same the session control means SC 303. The trusted multiple application function means may be pre-configured to the session control means SC 303. In decision making, the session control means SC 303 then takes into account information received from the trusted multiple application function means.

First, the application function means AF 305 sends a session authorization message comprising e.g. application session and media data and an authorization token request to the session control means SC 303. The application session and media data may include for each media component an application identification, packet classifier information, direction information, QoS information and application specific information. The authorization token request is included if the application function means AF 305 wants the session control means SC 303 to allocate an authorization token.

The application function means AF 305 may send information on multiple application sessions to the session control means SC 303. Further, multiple application function means may send information on the application sessions to the session control means SC 303.

Next, the session control means SC 303 allocates an authorization token, if requested by the application function means AF 305, and replies by sending a session authorization acknowledgement message comprising the authorization token to the application function means AF 305. The authorization token may be sent from the application function means AF 305 to the terminal device MS 301.

Next, the gateway node GW 302 receives a request for access bearer establishment or modification, such as a Create PDP Context Request or an Update PDP Context Request, comprising a user identification, an APN, an access network type, the authorization token and service flow identifications. The authorization token and service flow identifications are available, if sent by the mobile station MS 301. Multiple sets of authorization tokens and service flow identifications may also be available.

Next, the gateway node GW 302 resolves the session control means SC 303 address by using the authorization token. The gateway node GW 302 sends a service policy request comprising e.g. user identification, the APN, the access network type, the authorization token and the service flow identifications to the session control means SC 303. The gateway node GW 302 may receive the access network type in the request for access bearer establishment or modification. Alternatively the gateway node GW 302 may derive the access network type e.g. from the address of a Serving GPRS Support Node. The authorization token and the service flow identifications are included if received in the request for access bearer establishment or modification. Multiple sets of authorization tokens and service flow identifications may also be included.

Next, the authorization token and service flow identifications are used to access the information sent by the application function means AF 305. The subscription data or information pre-configured to the session control means SC 303 may be used e.g. to perform limitations for the information sent by the application function means AF 305 or to search additional information for generating service policies.

The session control means SC 303 generates one or more service policies and sends one or more generated service policies to the gateway node GW 302. In this exemplary embodiment, when generating a service policy, the session control means SC 303 take into account information sent by the gateway node GW 302, information sent by the application function means AF 305, subscription data and information pre-configured in the session control means SC 303 (e.g. service—service flow mapping, subscription data attribute—service rule mapping). In addition to the service information and the service rules comprised in the generated one or more service policies, the session control means SC 303 may send to the gateway node GW 302 a list of services allowed on the access bearer, indication of maximum values for the QoS class and indication of maximum bit rates for the access bearer, indication of maximum values for the QoS class and indication of maximum bit rates for each service flow.

The gateway node GW 302 enforces the received service policies. The gateway node GW 302 determines which service rules have to be indicated to the service entities and sends such rules to them. The gateway node GW 302 may also store the service rules for later distribution to the service entities, for example until a corresponding service flow is detected at the gateway node GW 302. Finally, the gateway node GW 302 acknowledges the access bearer establishment or modification.

The following describes operation of the exemplary embodiment of FIG. 3 in more detail when the packet data based communication network 300 is a General Packet Radio Service enabled mobile communication network and when subscription data in the subscriber database SUB_DB 304 is modified so that the modifications have to be reflected to the session control means SC 303 and the gateway node GW 302.

First, the subscriber database SUB_DB 304 notifies the session control means SC 303 that modifications in subscription data have taken place by sending an update notification message.

Next, the session control means SC 303 requests the modified subscription data either when receiving the update notification, when receiving the next request related to the user identification and APN from the gateway node GW 302, or periodically. The session control means SC 303 sends a request for the updated subscription data comprising the user identification and the APN to the subscriber database SUB_DB 304.

Next, the subscriber database SUB_DB 304 replies by sending the updated subscription data to the session control means SC 303. The updated subscription data comprises e.g. a unique subscription identity, a list of services provisioned for the subscription and personal attributes for rule creation. The session control means SC 303 stores the updated subscription data.

Next, the session control means SC 303 determines which access bearers and service flows are affected by the subscription data modification. The session control means SC 303 generates one or more service policies and sends one or more generated service policies to the gateway node GW 302. In addition to the service information indicating which services in which order shall be applied for the access bearer or for each service flow, and the service rules for each of the services controlled by the session control means SC 303, the session control means SC 303 may send to the gateway node GW 302 a list of services allowed on the access bearer, indication of maximum values for the QoS class and indication of maximum bit rates for the access bearer, indication of maximum values for the QoS class and indication of maximum bit rates for each service flow. The attributes requiring modifications are included.

Finally, the gateway node GW 302 enforces the service policies. The gateway node GW 302 determines which service rules have to be indicated to the service entities and sends such service rules to them.

The following describes operation of the exemplary embodiment of FIG. 3 in more detail when the packet data based communication network 300 is a General Packet Radio Service enabled mobile communication network and when application session and media data is updated. Update of application session and media data may happen e.g. when an application session is modified. During an ongoing application session, updates which have to be reflected to the session control means SC 303 may take place. The application function means AF 305 informs the session control means SC 303 about the new application session and media data. The session control means SC 303 may push generated service policies to the gateway node GW 302.

First, the application function means AF 305 decides to inform the session control means SC 303 about updated application session and media data. The application function means AF 305 sends a session information message comprising the application session and media data to the session control means SC 303. The application session and media data may include for each modified media component an application identification, packet classifier information, direction information, QoS information and application specific information.

Next, the session control means SC 303 replies by sending a session information acknowledgement message to the application function means AF 305.

Next, the subscription data or information pre-configured to the session control means SC 303 may be used e.g. to perform limitations for the information sent by the application function means AF 305 or to search additional information for generating service policies.

Then, the session control means SC 303 determines which access bearers and service flows are affected by the updated application session and media data. The session control means SC 303 generates one or more service policies and sends one or more generated service policies to the gateway node GW 302. In addition to the service information indicating which services in which order shall be applied for the access bearer or for each service flow, and the service rules for each of the services controlled by the session control means SC 303, the session control means SC 303 may send to the gateway node GW 302 a list of services allowed on the access bearer, indication of maximum values for the QoS class and indication of maximum bit rates for the access bearer, indication of maximum values for the QoS class and indication of maximum bit rates for each service flow. The attributes requiring modifications are included. The gateway node GW 302 enforces the service policies. The gateway node GW 302 determines which service rules have to be indicated to the service entities and sends such service rules to them.

The following describes operation of the exemplary embodiment of FIG. 3 in more detail when the packet data based communication network 300 is a General Packet Radio Service enabled mobile communication network and when pre-configured information in the session control means SC 303 is modified. If the pre-configured information in the session control means SC 303 is modified, the modifications may have to be reflected to the gateway node GW 302.

First, the pre-configured information in the session control means SC 303 is modified. The session control means SC 303 determines which access bearers and service flows are affected by the modification. For each such access bearer, the session control means SC 303 generates one or more service policies to the gateway node GW 302. In addition to the service information indicating which services in which order shall be applied for the access bearer or for each service flow, and the service rules for each of the services controlled by the session control means SC 303, the session control means SC 303 may send to the gateway node GW 302 a list of services allowed on the access bearer, indication of maximum values for the QoS class and indication of maximum bit rates for the access bearer, indication of maximum values for the QoS class and indication of maximum bit rates for each service flow. The attributes requiring modifications are included.

Then, the gateway node GW 302 enforces the service policies. The gateway node GW 302 determines which service rules have to be indicated to the service entities and sends such service rules to them.

The following describes operation of the exemplary embodiment of FIG. 3 in more detail when the packet data based communication network 300 is a General Packet Radio Service enabled mobile communication network, and when an access bearer is to be terminated without involvement of the application function means AF 305.

First, the gateway node GW 302 receives a request to terminate the access bearer or decides to terminate the access bearer itself.

Next, the gateway node GW 302 determines which service entities have to be informed about the access bearer termination and informs them to remove the relevant service rules. The service entities may remove the service rules immediately or after a timer expiry. The gateway node GW 302 informs the session control means SC 303 about the access bearer termination by sending a message to the session control means SC 303. The session control means SC 303 may remove the relevant subscription data immediately or after a timer expiry.

The following describes operation of the exemplary embodiment of FIG. 3 in more detail when the packet data based communication network 300 is a General Packet Radio Service enabled mobile communication network, and when an access bearer is to be terminated with involvement of the application function means AF 305.

First, the gateway node GW 302 receives a request to terminate an access bearer or decides to terminate the access bearer itself.

Next, the gateway node GW 302 determines which service entities have to be informed about the access bearer termination and informs them to remove the relevant service rules. The service entities may remove the service rules immediately or after a timer expiry. The gateway node GW 302 informs the session control means SC 303 about the access bearer termination by sending a message to the session control means SC 303. The session control means SC 303 may remove the relevant subscription data immediately or after a timer expiry.

Next, the session control means SC 303 informs the application function means AF 305 about the access bearer termination by sending a message. Finally, the application function means AF 305 replies by sending an acknowledgement message.

The following describes operation of the exemplary embodiment of FIG. 3 in more detail when the packet data based communication network 300 is a General Packet Radio Service enabled mobile communication network, and when an application session is to be terminated.

First, an application session is terminated.

Next, the application function means AF 305 informs the session control means SC 303 about the application session termination by sending a message. Then, the session control means SC 303 replies by sending an acknowledgement message to the application function means AF 305.

Next, the session control means SC 303 informs the gateway node GW 302 about the session termination by sending a service policy.

Next, the gateway node GW 302 determines which service entities have to be informed about the access bearer termination and informs them to remove the relevant service rules. The service entities may remove the service rules immediately or after a timer expiry. The gateway node GW 302 sends a message to the session control means SC 303. The session control means SC 303 may remove the relevant subscription data immediately or after a timer expiry.

The following describes operation of the exemplary embodiment of FIG. 3 in more detail when the packet data based communication network 300 is a General Packet Radio Service enabled mobile communication network, and when the detected change in the state of the connection Cn is a detected new service flow.

When the gateway node GW 302 detects a new service flow, it sends a service policy request to the session control means SC 303 and gets a service policy for the detected new service flow as a reply.

Later, when the detected new service flow is terminated, the gateway node GW 302 informs the respective service entities to remove the service rules. In an alternative embodiment, the service entities detect service flow termination themselves and remove the service rules. 'Detecting service flow termination' may be performed e.g. by detecting that no more packets belonging to a service flow has been received in a given time period. To facilitate this, a timer may be used.

It is obvious to a person skilled in the art that with the advancement of technology, the basic idea of the invention may be implemented in various ways. The invention and its embodiments are thus not limited to the examples described above, instead they may vary within the scope of the claims.

What is claimed is:

1. A system, comprising:
   a detector configured to detect a change in a state of a connection between a terminal device and a gateway node of a packet data based communication network;
   a first transmitter configured to send, in response to the change, a service policy request for said terminal device from the gateway node to a session controller;
   a generator configured to generate, at the session controller, in response to the service policy request, at least one service policy,
   wherein the at least one service policy is generated based on at least one of the service policy request, subscription data received by the session controller in response to a subscription data request from the session controller to a subscription database, and preconfigured information at the session controller,
   wherein said at least one service policy comprises service information indicating service entities which are to be utilized for providing services to said terminal device and an order in which the service entities are to be utilized for providing services to said terminal device;

a second transmitter configured to transmit the at least one service policy to the gateway node; and a provider configured to provide, at the indicated service entities, services in the indicated order, wherein the gateway node is configured to determine which service rules included in the received at least one service policy have to be indicated to the service entities, and to send said determined service rules to the respective service entities to process the packet data in the order indicated by the service information of said at least one service policy.

2. A method, comprising:

detecting a change in a state of a connection between a terminal device and a gateway node of a packet data based communication network;

sending, in response to the change, a service policy request for said terminal device from the gateway node to a session controller of the packet data based communication network;

receiving at least one service policy from the session controller, wherein the at least one service policy is generated based on at least one of the service policy request, subscription data received by the session controller in response to a subscription data request from the session controller to a subscription database, and preconfigured information at the session controller, wherein said at least one service policy comprises service information indicating service entities which are to be utilized for providing services to said terminal device and an order in which the indicated service entities are to be utilized for providing services to said terminal device;

determining at the gateway node which service rules included in the received at least one service policy have to be indicated to the service entities; and sending said determined service rules from the gateway node to the respective service entities to process the packet data in the order indicated by the service information of said at least one service policy;

wherein services are provided in the indicated order, at the indicated service entities.

3. The method according to claim 2, further comprising:

forwarding, in the indicated sequence order, from the gateway node to each of the indicated service entities, at least one service entity specific service rule according to which the respective service entity is to provide its services, wherein the services of each indicated service entity are provided according to its respective at least one service rule received from the gateway node.

4. The method according to claim 3, wherein the packet data based communication network comprises an internet protocol based wireless communication network.

5. The method according to claim 4, wherein the internet protocol based wireless communication network comprises one of a wireless local area network, a general packet radio service enabled mobile communication network, and a code division multiple access based network.

6. The method according to claim 5, wherein the gateway node comprises one of a packet data gateway of the wireless local area network, a gateway general packet radio service support node of the general packet radio service enabled mobile communication network, and a packet data serving node of the code division multiple access based network.

7. The method according to claim 3, further comprising storing the at least one service policy received from the session controller at the gateway node.

8. The method according to claim 3, wherein each service entity specific service rule is stored at the respective service entity that received it from the gateway node.

9. The method according to claim 2, wherein said change comprises one of a received request for access bearer establishment and a received request for access bearer modification.

10. The method according to claim 9, wherein the at least one service entity specific service rule is deleted after the established access bearer is released.

11. The method according to claim 2, wherein said change comprises a request for establishing a service flow.

12. The method according to claim 11, wherein the at least one service entity specific service rule is deleted after the detected new service flow is terminated.

13. The method according to claim 2, further comprising storing the service rules at the gateway node for later distribution to the service entities.

14. A method, comprising:

receiving a service policy request for a terminal device from a gateway node, at a session controller of a packet data based communication network, when a change in a state of a connection between the terminal device and the gateway node has been detected;

generating, at the session controller, in response to the service policy request, at least one service policy, wherein the at least one service policy is generated based on at least one of the service policy request, subscription data received by the session controller in response to a subscription data request from the session controller to a subscription database, and preconfigured information at the session controller, wherein said at least one service policy comprises service information indicating network service entities which are to be utilized for providing services to said terminal device and an order in which the indicated network service entities are to be utilized for providing services to said terminal device; and sending the at least one service policy to the gateway node, the gateway node configured to determine which service rules included in the received at least one service policy have to be indicated to the service entities, and to send said determined service rules to the respective service entities to process the packet data in the order indicated by the service information of said at least one service policy.

15. The method according to claim 14, wherein said generating further comprises generating at least one network service entity specific service rule according to which said network service entities are to provide their respective services.

16. The method according to claim 14, further comprising:

sending, prior to said generating the at least one service policy, a request for subscription data associated with a subscriber of said terminal device from the session controller to a subscriber database of the packet data based communication network;

receiving the subscription data in response to the request; and utilizing the subscription data in generating the at least one service policy.

17. The method according to claim 16, wherein the subscriber database updates said subscription data associated with said subscriber of said terminal device, the method further comprising:
sending a request for the updated subscription data to the subscriber database; and receiving the updated subscription data in response to the request.

18. The method according to claim 14, further comprising:
receiving, prior to said generating the at least one service policy, application session and media data from an application function network element; and
utilizing the application session and media data in generating the at least one service policy.

19. The method according to claim 18, wherein the application function network element updates said application session and media data, the method further comprising receiving the updated application session and media data.

20. The method according to claim 14, wherein said services to be provided include at least one of rerouting, barring, accounting, content proxy service, content blocking service, firewall service, virus scanning service, antispam service, performance enhancement proxy service, virtual private network service, quality of service related service, and charging related service for at least one of online and offline charging.

21. An apparatus, comprising:
a detector configured to detect a change in a state of a connection between a terminal device and the apparatus of a packet data based communications network;
a service policy requesting unit configured to send to a session controller, in response to the change, a service policy request for said terminal device; and
a receiver configured to receive at least one service policy from the session controller,
wherein the at least one service policy is generated based on at least one of the service policy request, subscription data received by the session controller in response to a subscription data request from the session controller to a subscription database, and preconfigured information at the session controller,
wherein said at least one service policy comprises service information indicating service entities which are to be utilized for providing services to said terminal device and an order in which the indicated service entities are to be utilized for providing services to said terminal device,
wherein services are provided in the indicated order, at the indicated service entities, and wherein the apparatus is configured to determine which service rules included in the received at least one service policy have to be indicated to the service entities, and to send said determined service rules to the respective service entities to process the packet data in the order indicated by the service information of said at least one service policy.

22. The apparatus according to claim 21, further comprising:
a forwarder configured to forward to each of the indicated service entities, at least one service entity specific service rule according to which the respective service entity is to provide its services,
wherein the services of each indicated service entity are provided according to its respective at least one service rule received from the apparatus.

23. The apparatus according to claim 22, wherein the packet data based communication network comprises an internet protocol based wireless communication network.

24. The apparatus according to claim 23, wherein said change comprises one of a received request for access bearer establishment and a received request for access bearer modification.

25. The apparatus according to claim 24, wherein the at least one service entity specific service rule is deleted after the established access bearer is released.

26. The apparatus according to claim 23, wherein said change comprises a detected new service flow.

27. The apparatus according to claim 26, wherein the at least one service entity specific service rule is deleted after the detected new service flow is terminated.

28. The apparatus according to claim 23, wherein the internet protocol based wireless communication network comprises one of a wireless local area network, a general packet radio service enabled mobile communication network, and a code division multiple access based network.

29. The apparatus according to claim 28, wherein the apparatus comprises one of a packet data gateway of the wireless local area network, a gateway general packet radio service support node of the general packet radio service enabled mobile communication network, and a packet data serving node of the code division multiple access based network.

30. The apparatus according to claim 22, further comprising a storage configured to store the at least one service policy received from the session controller.

31. The apparatus according to claim 22, wherein each service entity specific service rule is stored at the respective service entity that received it from the apparatus.

32. The apparatus according to claim 21, wherein said apparatus is further configured to store the service rules for later distribution to the service entities.

33. An apparatus, comprising:
a receiver configured to receive a service policy request for a terminal device from a gateway node of a packet data based communications network, when a change in a state of a connection between the terminal device and the gateway node has been detected;
a generator configured to generate, in response to the service policy request, at least one service policy,
wherein the at least one service policy is generated based on at least one of the service policy request, subscription data received by the session controller in response to a subscription data request from the session controller to a subscription database, and preconfigured information at the session controller,
wherein said at least one service policy comprises service information indicating network service entities which are to be utilized for providing services to said terminal device and an order in which the indicated network service entities are to be utilized for providing services to said terminal device; and
a transmitter configured to send the at least one service policy to the gateway node, the gateway node being configured to determine which service rules included in the received at least one service policy have to be indicated to the service entities, and to send said determined service rules to the respective service entities to process the packet data in the order indicated by the service information of said at least one service policy.

34. The apparatus according to claim 33, wherein said generator is further configured to generate at least one network service entity specific service rule according to which said network service entities are to provide their respective services.

35. The apparatus according to claim 33, further comprising:
a subscription data requesting unit configured to send a request for subscription data associated with a subscriber of said terminal device to a subscriber database of the packet data based communication network,
wherein the receiver is further configured to receive the subscription data in response to the request, and
wherein the generator is further configured to utilize the subscription data in generating the at least one service policy.

36. The apparatus according to claim 35, wherein the subscriber database updates said subscription data associated with said subscriber of said terminal device, the apparatus further comprising:
a subscription data update requesting unit configured to send a request for the updated subscription data to the subscriber database,
wherein the receiver is further configured to receive the updated subscription data in response to the request.

37. The apparatus according to claim 33,
wherein the receiver is further configured to receive application session and media data from an application function network element, and
wherein the generator is further configured to utilize the application session and media data in generating the at least one service policy.

38. The apparatus according to claim 37, wherein the application function network element updates said application session and media data, and wherein the receiver is further configured to receive the updated application session and media data.

39. The apparatus according to claim 33, wherein said services to be provided include at least one of rerouting, barring, accounting, content proxy service, content blocking service, firewall service, virus scanning service, antispam service, performance enhancement proxy service, virtual private network service, quality of service related service, and charging related service for at least one of online and offline charging.

40. A computer program, embodied on a non-transitory computer-readable medium, configured to control a processor to provide operations comprising:
detecting a change in a state of a connection between a terminal device and a gateway node of a packet data based communication network;
sending, in response to the change, a service policy request for said terminal device from the gateway node to a session controller of the packet data based communication network;
receiving at least one service policy from the session controller,
wherein the at least one service policy is generated based on at least one of the service policy request, subscription data received by the session controller in response to a subscription data request from the session controller to a subscription database, and preconfigured information at the session controller,
wherein said at least one service policy comprises service information indicating service entities which are to be utilized for providing services to said terminal device and an order in which the indicated service entities are to be utilized for providing services to said terminal device;
determining at the gateway node which service rules included in the received at least one service policy have to be indicated to the service entities; and
sending said determined service rules from the gateway node to the respective service entities to process the packet data in the order indicated by the service information of said at least one service policy;
wherein services are provided in the indicated order, at the indicated service entities.

41. A computer program, embodied on a non-transitory computer-readable medium, configured to control a processor to provide operations comprising:
receiving a service policy request for a terminal device from a gateway node, at a session controller of a packet data based communication network, when a change in a state of a connection between the terminal device and the gateway node has been detected;
generating, at the session controller, in response to the service policy request, at least one service policy,
wherein the at least one service policy is generated based on at least one of the service policy request, subscription data received by the session controller in response to a subscription data request from the session controller to a subscription database, and preconfigured information at the session controller,
wherein said at least one service policy comprises service information indicating network service entities which are to be utilized for providing services to said terminal device and an order in which the indicated network service entities are to be utilized for providing services to said terminal device; and
sending the at least one service policy to the gateway node, the gateway node being configured to determine which service rules included in the received at least one service policy have to be indicated to the service entities, and to send said determined service rules to the respective service entities to process the packet data in the order indicated by the service information of said at least one service policy.

* * * * *